United States Patent
Panda et al.

(10) Patent No.: US 7,840,215 B2
(45) Date of Patent: Nov. 23, 2010

(54) SYSTEM ACCOUNTING IN A MULTIPROCESSOR ENVIRONMENT

(75) Inventors: Biswaranjan Panda, Santa Clara, CA (US); Bhaskar Bhupalam, Sunnyvale, CA (US); Timothy Stammers, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 531 days.

(21) Appl. No.: 11/786,325

(22) Filed: Apr. 11, 2007

(65) Prior Publication Data

US 2008/0254793 A1    Oct. 16, 2008

(51) Int. Cl.
  *H04W 4/00* (2009.01)
  *G06F 15/173* (2006.01)
  *G06F 15/16* (2006.01)
(52) U.S. Cl. .............. 455/435.1; 709/224; 709/228
(58) Field of Classification Search .......... 709/228; 455/435.1
See application file for complete search history.

(56) References Cited

U.S. PATENT DOCUMENTS 6,650,887 B2   11/2003  McGregor et al.
6,792,457 B1*  9/2004   Zhang et al. ............... 709/224
7,536,464 B1*  5/2009   Dommety et al. .......... 709/228
2007/0094401 A1* 4/2007 Gagne et al. ............... 709/229

OTHER PUBLICATIONS

"Interworking between the Public Land Mobile Network (PLMN) supporting packet based services and Packet Data Networks (PDN)", 3GPP Specification Detail, Aquired at: http://www.3gpp.org/ftp/Specs/html-info/29061.htm 4 pages.

C. Rigney, et al., "Remote Authentication Dial In User Service (RADIUS)", Network Working Group, Aquired at: http://www.ietf.org/rfc/rfc2865.txt, 68 pages, Jun. 2000.

\* cited by examiner

*Primary Examiner*—Marivelisse Santiago-Cordero
(74) *Attorney, Agent, or Firm*—Trellis IP Law Group, PC

(57) ABSTRACT

In one embodiment, a method can include: (i) assigning an attribute to each of a plurality of processors, and designating one of the plurality of processors as a proxy processor; (ii) when a user session begins using a first of the plurality of processors, sending a first notification message to a server; and (iii) when a rebooting of the first processor occurs: (a) suppressing a second notification message from the first processor in the proxy processor; and (b) sending a third notification message with the attribute to the server to enable the server to modify a user file in the server using the attribute.

25 Claims, 4 Drawing Sheets

SYSTEM ACCOUNTING IN A MULTIPROCESSOR ENVIRONMENT

TECHNICAL FIELD

The present disclosure relates generally to a mechanism for system accounting in a multiprocessor environment to enable improved manageability.

BACKGROUND

In conventional mobile systems, multiple processors may act as individual gateways in a single chassis. Each of these gateways may send its own system accounting messages when that gateway processor reloads or shuts down. Conventional approaches to improve manageability include providing a single Internet protocol (IP) view of all gateways in the chassis to external nodes, such as a RADIUS (remote authentication dial-in user service) server, serving GPRS (general packet radio service) support node (SGSN), etc. In such an environment, one of the processors may be used as a RADIUS proxy, and all gateway processors can send RADIUS messages to the RADIUS proxy server, which in turn can forward such messages to an actual RADIUS server.

While this conventional approach may work well for session level accounting messages, it may not work well for system accounting messages. For example, when one of the gateway processors reloads, it can send an "accounting ON" message to the proxy, but it may not be desirable for the proxy to forward this message to the actual RADIUS server because the whole chassis has not reloaded. In addition, it is desirable for the RADIUS server to clean up the user sessions belonging to the gateway processor that reloaded.

DESCRIPTION OF EXAMPLE EMBODIMENTS

Overview

In one embodiment, a method can include: (i) assigning an attribute to each of a plurality of processors, and designating one of the plurality of processors as a proxy processor; (ii) when a user session begins using a first of the plurality of processors, sending a first notification message to a server; and (iii) when a rebooting of the first processor occurs: (a) suppressing a second notification message from the first processor in the proxy processor; and (b) sending a third notification message with the attribute to the server to enable the server to modify a user file in the server using the attribute.

In one embodiment, an apparatus can include a plurality of processors having a proxy processor, where each processor is assigned an attribute, and where: (i) a first of the plurality of processors can send a first notification message to a server, the first notification message being related to a user session; and (ii) the proxy processor can suppress a second notification message from the first processor, and send a third notification message with the attribute to the server to enable the server to modify a user file using the attribute, when a rebooting of the first processor occurs.

In one embodiment, an apparatus can include a server configured to receive a first notification message from a first of a plurality of processors, the first notification message being related to a user session, where: (i) each processor is assigned an attribute, and the plurality of processors comprises a proxy processor, the proxy processor being configured to suppress a second notification message from the first processor; and (ii) the server is configured to receive a third notification message with the attribute from the proxy processor when a rebooting of the first processor occurs, and to modify a user file using the attribute in response to the third notification message.

Example Embodiments

Generally, accounting records can include charging records (e.g., for billing purposes), and types of accounting records can include system accounting and network accounting. Network accounting can include information about usage, while system accounting notification messages can be sent upon booting/reload of a given processor. These can be sent to a remote authentication dial-in user service (RADIUS) server, for example. System accounting messages include accounting ON (e.g., when the processor comes on), and accounting OFF (e.g., when the processor is shutting down). Network accounting messages include accounting START and accounting STOP when a user session comes up or goes down, respectively.

In particular embodiments, a special attribute called "session-correlator" in accounting START or STOP messages may be used as an alternative to other system accounting messages. Accordingly, instead of sending multiple accounting STOP messages, a single accounting STOP message with a special attribute may be used as an alternative to system accounting messages.

Figure 1:
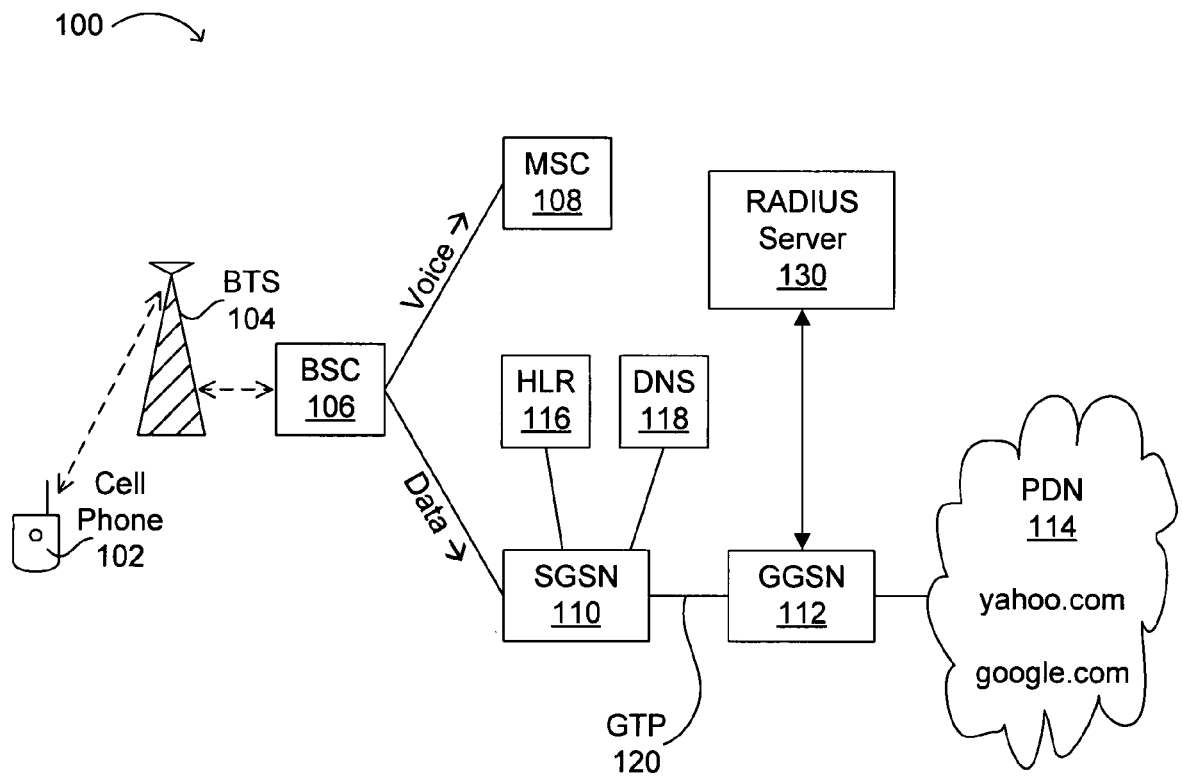
FIG. 1 illustrates an example general packet radio service (GPRS) network.

Referring now to FIG. 1, an example general packet radio service (GPRS) network is shown and indicated by the general reference character 100. Such a network can employ UMTS 2.5 GHz and/or 3 GHz standards, for example. Cell phone 102 calls can be received/transmitted by Base Transceiver Station (BTS) 104, which can interface with Base Station Controller (BSC) 106. If a call from cell phone 102 is a voice call, it can be routed to Mobile Switching Center (MSC) 108. However, if the call is a data call, it can be routed to Serving GPRS Support Node (SGSN) 110. In any event, such a call can begin a user session. Gateway GPRS Support Node (GGSN) 112 can be a server and/or part of a switch/router, and may represent a point of attachment or "gateway," for example. Cell phone 102 can be any device (e.g., a laptop, handset, or another type of phone) that can access the Internet (e.g., Public Data Network (PDN) 114).

IP services that can be supplied to a mobile user of cell phone 102 can include services available via GGSN 112, such as quality of service (QoS), Internet protocol (IP) address allocation, security, policy, and billing/charging. Further, SGSN 110 can provide wireless service control for a user (e.g., a user of cell phone 102). Such service control can include a user profile via Home Location Registry (HLR) 116 and/or Domain Name Service (DNS) 118. Once a user connection is established, the user information can be retrieved from a database stored on HLR 116. For example, a determination of the types of service that a particular user is authorized to utilize can occur in this fashion. Further, other parameters can also be supplied, such as QoS profile, access mode, and/or Access Point Name (APN). An APN is essentially a logical name referring to a GGSN and an external network.

Cell phone 102 can have a user initially identified by IMSI (International Mobile Subscriber Identifier). With such information, SGSN 110 can retrieve the appropriate subscriber information for this user (e.g., an APN that the user is attempting to access from PDN 114). Such an APN may be provided via one server coupled to an actual web site (e.g., yahoo.com or google.com) that the user wishes to access. To facilitate this accessing, SGSN 110 can determine which of several possible GGSNs (e.g., GGSN 112) should be utilized for the connection. Each such GGSN may be able to support a subset of all APNs or other local settings and/or configurations of the APNs allocated to a particular GGSN, for example.

GPRS Tunneling Protocol (GTP) 120 can be used to set up a user connection between SGSN 110 and GGSN 112. Among the parameters in GTP 120 are Mobile Service IP (MSIP) address, QoS, access mode, and billing/charging characteristics, to name just a few. In one embodiment, this parameter information can be stored in GGSN 112. In operation, when SGSN 110 receives an activation or access request (e.g., initiated via cell phone 102), SGSN 110 can pass such associated GTP 120 to GGSN 112. The parameter information can be stored in GGSN 112 as part of a Packet Data Protocol (PDP), which can be a GTP session or context for each user.

Remote authentication dial-in user service (RADIUS) server 130 can interface with GGSN 112 in a client/server arrangement. For example, a RADIUS server can utilize an AAA (authentication, authorization, and accounting) protocol for applications, such as network access or IP mobility. A RADIUS server may also be notified if/when a user session starts and/or stops, so that the user can be billed accordingly, or such data can be used for other statistical purposes.

In addition, RADIUS may be used by voice over Internet protocol (VoIP) service providers. For example, RADIUS may be used to pass login credentials of a session initiation protocol (SIP) end point (e.g., a broadband phone) to a SIP registrar using digest authentication, and then to a RADIUS server using RADIUS. Also, RADIUS may be used to collect call detail records (CDRs) that may be used to bill customers for international long distance, for example.

In particular embodiments, a mechanism can be utilized to summarize accounting records, and to facilitate RADIUS server modification or cleanup of a subset of user sessions belonging to the mobile exchange (e.g., Cisco mobile exchange or CMX) gateway. In one example, an accounting STOP message may be used as an alternate system accounting message. Further, in accounting START messages originating from an internal gateway processor, a new RADIUS vendor specific attribute (VSA) (e.g., session-correlator) may be added. This session-correlator may have a unique value for each internal gateway processor, such as a unique ID. Accordingly, all accounting START messages originating from an internal gateway processor may have a same session-correlator value.

When an internal gateway processor reloads or gracefully shuts down, the gateway may send accounting ON or OFF messages, which may be intercepted by a RADIUS proxy processor. In particular embodiments, this proxy processor can suppress these messages, and instead substitute an accounting STOP message with the session-correlator attribute set to the unique value for the reloading internal gateway. A RADIUS server, upon receipt of such an accounting STOP message with the presence of a session-correlator attribute, may modify or cleanup associated user session files for which the RADIUS server had earlier received an accounting START with the same session-correlator value. Also in particular embodiments, existing AAA attributes, such as network access server identification (NAS-ID), can also be utilized as session-correlator. Accordingly, an existing attribute may be used, instead of creating a new message type.

Figure 2:
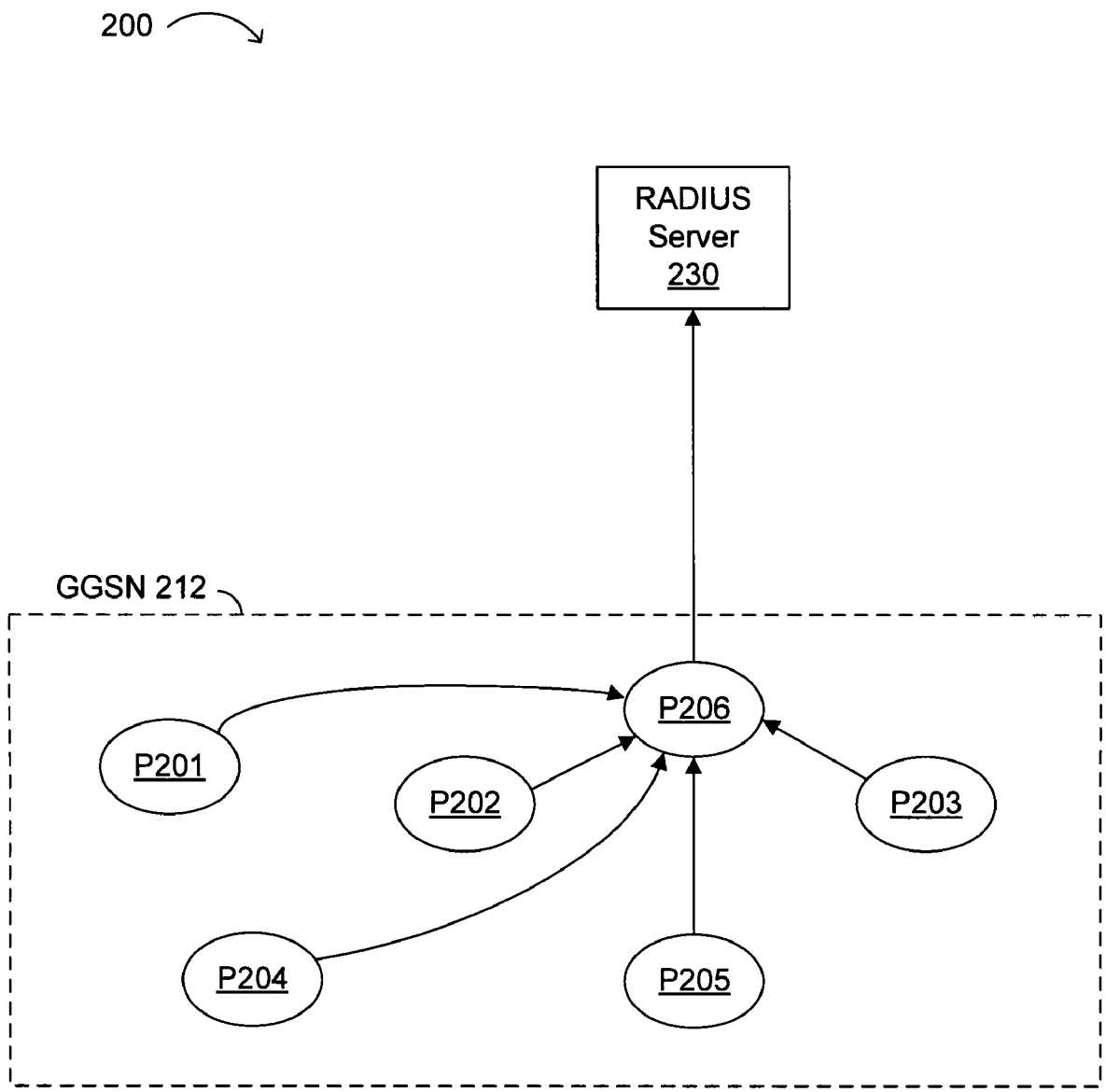
FIG. 2 illustrates an example multiprocessor gateway GPRS support node (GGSN) and remote authentication dial-in user service (RADIUS) server arrangement.

Referring now to FIG. 2, an example multiprocessor gateway GGSN and RADIUS server arrangement is shown and indicated by the general reference character 200. GGSN 212 can include multiple "gateway" processors, such as P201, P202, P203, P204, P205, and P206, and may interface to RADIUS server 230. Further, processor P206 may be designated as a RADIUS proxy processor, and thus may collect messages from the other processors, and send along to RADIUS server 230.

In general, it may be desirable to have the processors shown in GGSN 212 appear as a single processor. Further, one purpose of accounting as described above is to ensure the RADIUS server modifies or cleans up records associated with a given processor and/or user session. When there is an accounting ON, the RADIUS server may become aware that a given processor has reloaded. This accounting ON notification message may be suppressed in the RADIUS proxy processor (e.g., P206) in order to ensure that RADIUS server 230 does not view the entirety of GGSN 212 as being reloaded. Instead, proxy processor P206 may send an accounting STOP message to RADIUS server 230.

Accordingly, in particular embodiments, a single accounting STOP message may be used to enable RADIUS server 230 to clean up user files belonging to and/or associated with the processor which reloaded. Typically, when a user session comes up, an accounting STOP notification message may be sent. However, initially there may be a unique identifier assigned for each processor in GGSN 212. Further, an attribute (e.g., session-correlator) may be added, and included in an accounting START message. Thus, when a user session begins in a designated processor, an accounting START message having a session-correlator attribute may be sent to RADIUS server 230.

Figure 3:
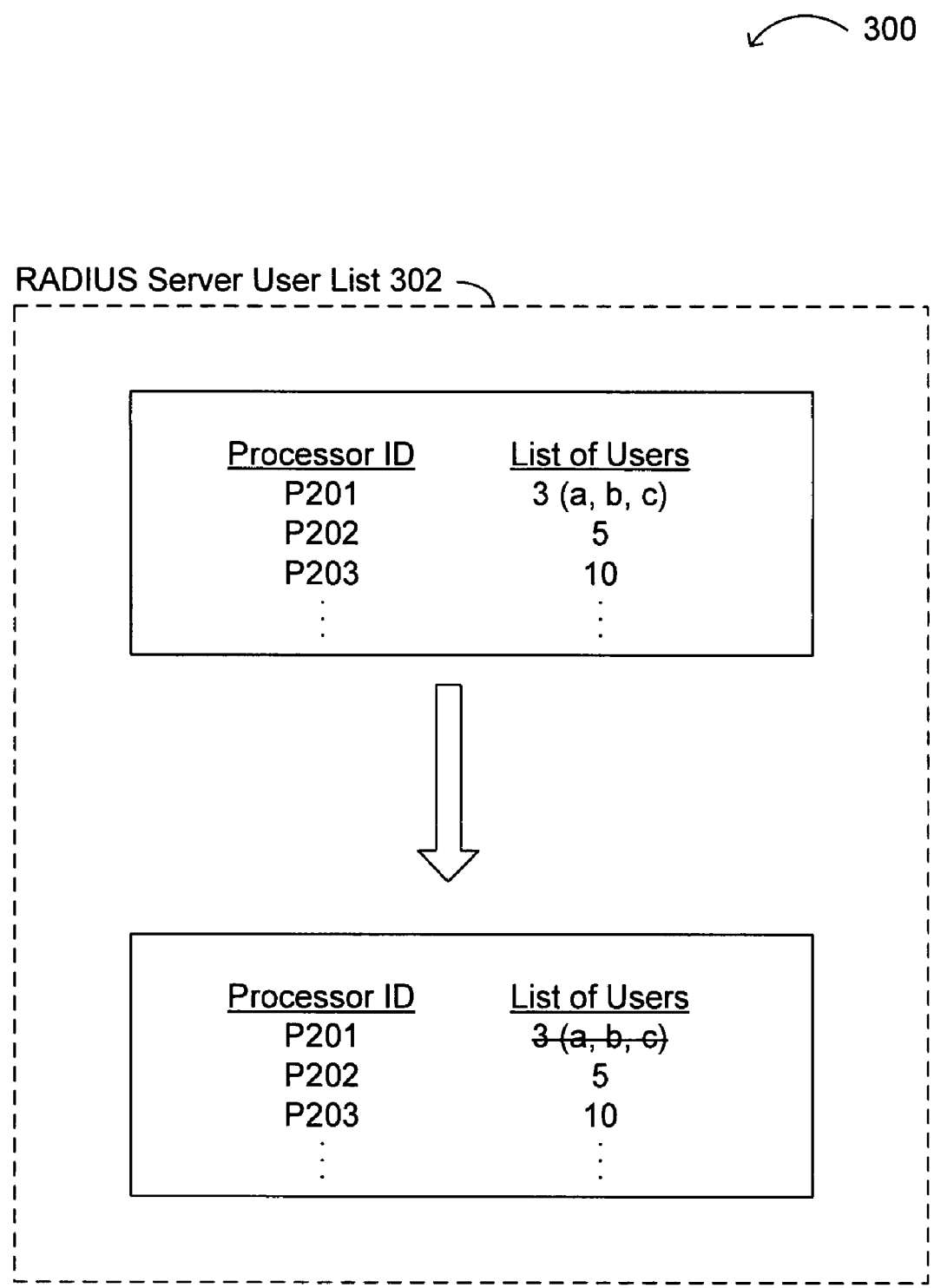
FIG. 3 illustrates an example user list modification in the RADIUS server.

Referring now to FIG. 3, an example user list modification in the RADIUS server is shown and indicated by the general reference character 300. In particular embodiments, a RADIUS server can include a database with a user list 302. Such a user list can include a list of processor identifiers, along with a corresponding list of users, as shown. Once the RADIUS server has received an accounting STOP message (e.g., from processor P201) having a session-correlator attribute, a list of users for processor P201 (e.g., users a, b, and c) can be cleaned out, or otherwise modified.

Figure 4:
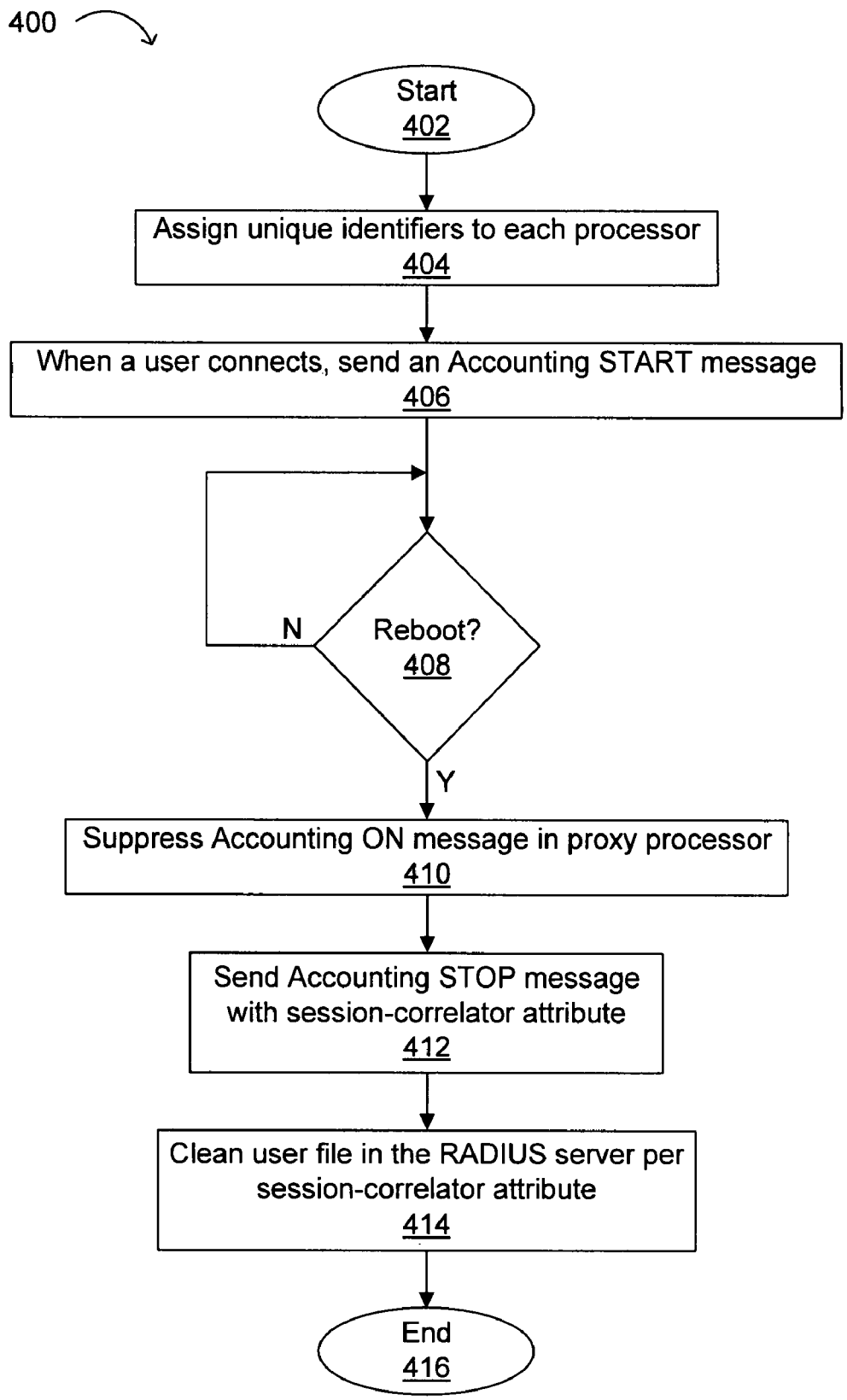
FIG. 4 illustrates a flow diagram of an example system accounting method.

Referring now to FIG. 4, a flow diagram of an example system accounting method is shown and indicated by the general reference character 400. The flow can begin (402), and unique identifiers may be assigned to each processor (e.g., in a GGSN) (404). When a user connects, an accounting START or other suitable notification message, can be sent to a RADIUS server (406). This accounting START message can include a session-correlator attribute, which can be a unique identifier, for example. An associated RADIUS server may thus track those user sessions.

When there is a rebooting or reloading of one of the processors in the GGSN (408), an accounting ON message from that processor can be suppressed in the proxy processor (410). An accounting STOP message may be sent with a session-correlator attribute from the proxy processor to the RADIUS server (412). Then, the RADIUS server may clean or modify a user file corresponding to the session-correlator attribute (414), and the flow can complete (416).

Thus, particular embodiments may generally avoid overloading of a RADIUS server, for example. Further, particular embodiments may avoid maintaining details of sessions in a proxy, sending accounting STOP notifications upon any of the internal gateway processor crashing, and/or may avoid requiring a reload of the whole system corresponding to a single gateway in order to clear user sessions on the RADIUS server.

Although the description has been described with respect to particular embodiments thereof, these particular embodiments are merely illustrative, and not restrictive. For example, while particular types of notification messages (e.g., accounting ON/OFF and START/STOP) have been described in particular examples, other types of notification message can be employed in particular embodiments. Also, while GGSN and RADIUS servers and/or systems have been described, other types of servers, systems, or nodes, can be utilized in particular embodiments.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as standalone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that what is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method, comprising:
assigning an attribute to each of a plurality of processors in a gateway, wherein one of the plurality of processors is designated as a proxy processor such that the plurality of processors appear as a single processor to a server for accounting purposes;
when a user session begins using a first of the plurality of processors, sending a first notification message from the proxy processor to the server, wherein the first notification message is sent with a first attribute corresponding to the first processor, the first notification message being a first network accounting message; and
when a rebooting of the first processor occurs:
suppressing a second notification message from the first processor in the proxy processor, wherein the second notification message comprises a system accounting message; and
sending a third notification message from the proxy processor to the server in substitution for the suppressed second notification message, the third notification message being a second network accounting message different from the first network accounting message, the third notification message having the first attribute and being used to enable the server to modify a user file in the server using the first attribute.

2. The method of claim 1, wherein the first attribute comprises at least one of a unique identifier and a session-correlator.

3. The method of claim 1, wherein the server comprises a remote authentication dial-in user service (RADIUS) server.

4. The method of claim 3, wherein the proxy processor comprises a RADIUS proxy.

5. The method of claim 3, wherein each of the plurality of processors is configured in a gateway GPRS (general packet radio service) support node (GGSN) coupled to the RADIUS server.

6. The method of claim 5, wherein the first notification message comprises an accounting START message.

7. The method of claim 5, wherein the second notification message comprises an accounting ON or accounting OFF message.

8. The method of claim 5, wherein the third notification message comprises an accounting STOP message.

9. The method of claim 1, wherein the modifying the user file comprises deleting a list of users for the first processor.

10. The method of claim 1, wherein the user session comprises a mobile phone call.

11. The method of claim 1, wherein:
the second notification message is suppressed such that the server does not view an entirety of the plurality of processors as being rebooted.

12. An apparatus, comprising:
a plurality of processors in a gateway, the gateway having a proxy processor from among the plurality of processors such that the plurality of processors appear as a single processor to a server for accounting purposes, wherein each processor is assigned an attribute, and wherein:
a first of the plurality of processors is configured to send a first notification message via the proxy processor to the server, the first notification message being related to a user session, wherein the first notification message is sent with a first attribute corresponding to the first processor, the first notification message being a first network accounting message; and
the proxy processor is configured to suppress a second notification message from the first processor, wherein the second notification message comprises a system accounting message, and in substitution for the suppressed second notification message, send a third notification message with the first attribute to the server to enable the server to modify a user file using the first attribute, when a rebooting of the first processor occurs, the third notification message being a second network accounting message different from the first network accounting message.

13. The apparatus of claim 12, wherein the first attribute comprises at least one of a unique identifier and a session-correlator.

14. The apparatus of claim 12, wherein each of the plurality of processors is configured in a gateway GPRS (general packet radio service) support node (GGSN) coupled to a remote authentication dial-in user service (RADIUS) server.

15. The apparatus of claim 14, wherein the proxy processor comprises a RADIUS proxy.

16. The apparatus of claim 15, wherein the first notification message comprises an accounting START message.

17. The apparatus of claim 15, wherein the second notification message comprises an accounting ON or accounting OFF message.

18. The apparatus of claim 15, wherein the third notification message comprises an accounting STOP message.

19. An apparatus, comprising:
a server configured to receive a first notification message from a first of a plurality of processors in a gateway, the first notification message being related to a user session, wherein the first notification message is received with a first attribute that corresponds to the first processor, the first notification message being a first network accounting message wherein:
each processor is assigned an attribute, and the plurality of processors comprises a proxy processor such that the plurality of processors appear as a single processor to the server for accounting purposes, the proxy processor being configured to suppress a second notification message from the first processor, wherein the second notification message comprises a system accounting message; and
the server is configured to receive a third notification message from the proxy processor in substitution by the proxy processor for the suppressed second notification message, the third notification message being a second network accounting message different from the first network accounting message, the third notification message having the first attribute from the proxy processor when a rebooting of the first processor occurs, and being used by the server to modify a user file using the first attribute in response to the third notification message.

20. The apparatus of claim 19, wherein the first attribute comprises at least one of a unique identifier and a session-correlator 21. The apparatus of claim 19, wherein the server comprises a remote authentication dial-in user service (RADIUS) server.

22. The apparatus of claim 19, wherein the first notification message comprises an accounting START message.

23. The apparatus of claim 19, wherein the second notification message comprises an accounting ON or accounting OFF message.

24. The apparatus of claim 19, wherein the third notification message comprises an accounting STOP message.

25. A system for providing system accounting, the system comprising:

means for assigning an attribute to each of a plurality of processors in a gateway, wherein one of the plurality of processors is designated as a proxy processor such that the plurality of processors appear as a single processor to a server for accounting purposes;

means for sending a first notification message from the proxy processor to the server when a user session begins using a first of the plurality of processors, wherein the first notification message is sent with a first attribute corresponding to the first processor, the first notification message being a first network accounting message; and when a rebooting of the first processor occurs:

means for suppressing a second notification message from the first processor in the proxy processor, wherein the second notification message comprises a system accounting message; and means for sending a third notification message from the proxy processor to the server in substitution for the suppressed second notification message, the third notification message being a second network accounting message different from the first network accounting message, the third notification message having the first attribute and being used to enable the server to modify a user file in the server using the first attribute.

\* \* \* \* \*